July 7, 1925.
W. G. WALL
SHOCK ABSORBER
Filed July 24, 1923
1,544,704
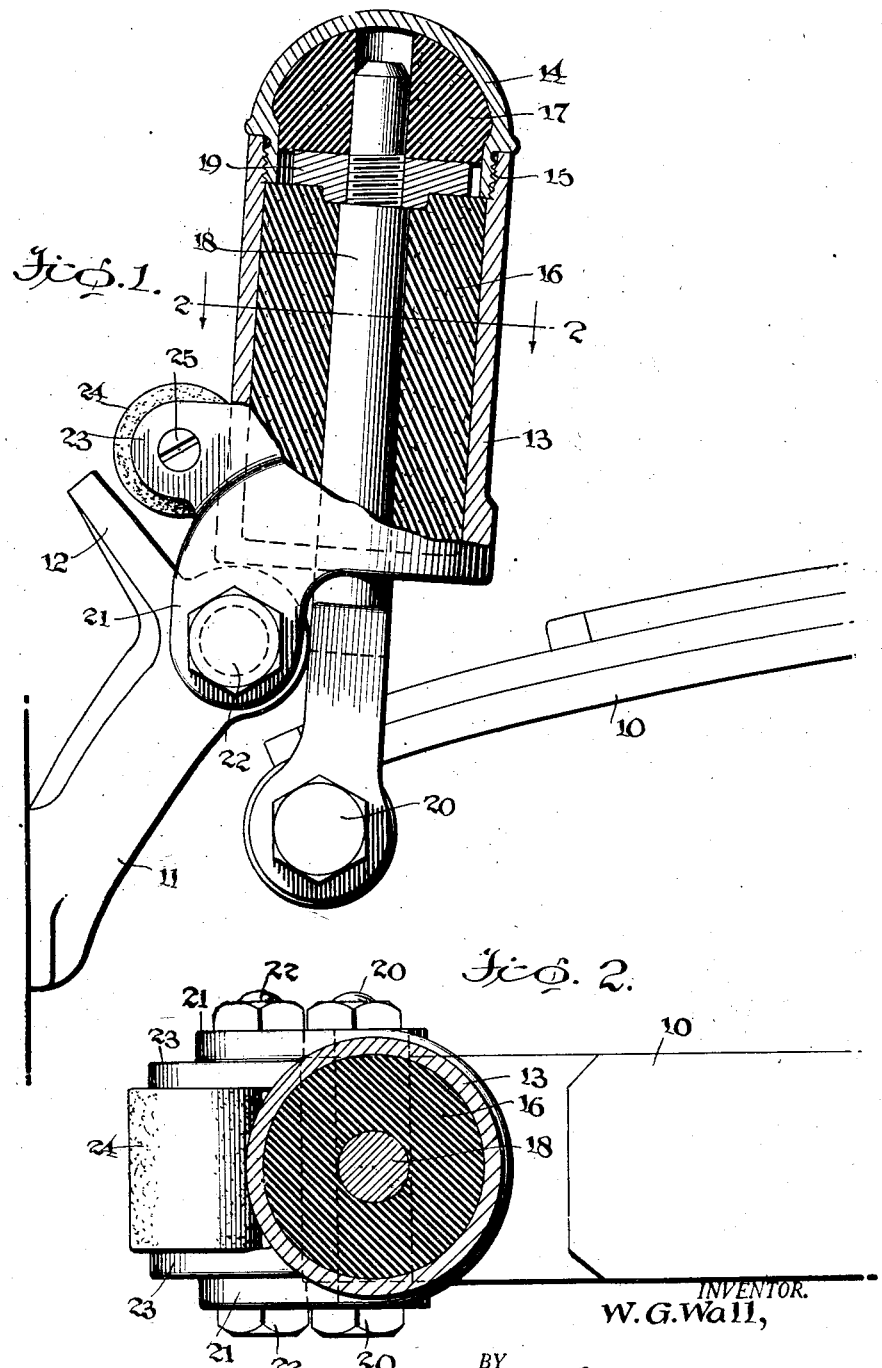
INVENTOR.
W. G. Wall,
BY
ATTORNEY.

Patented July 7, 1925.

1,544,704

UNITED STATES PATENT OFFICE.

WILLIAM GUY WALL, OF INDIANAPOLIS, INDIANA.

SHOCK ABSORBER.

Application filed July 24, 1923. Serial No. 653,553.

*To all whom it may concern:*

Be it known that I, WILLIAM GUY WALL, a citizen of the United States, residing at Indianapolis, in the county of Marion and State of Indiana, have invented certain new and useful Improvements in Shock Absorbers, of which the following is a specification.

This invention relates to shock absorbers primarily used on cars having semi-elliptic springs between the vehicle body and the axles where the springs are rigidly secured to the body at their centers and have their outer ends carried by dependent links mounted to swing from fixed yokes on the axles, the links serving to permit free elongation of the springs on depression thereof.

One of the objects of the invention is to provide a yielding non-metallic medium between the body of the vehicle and the axles.

Another object of the invention is to provide a device that will obviate the use of links heretofore used betweeen the yoke and the ends of the spring device.

Another object of the invention is to provide a construction in which the cylinder and the end of the spring device are kept in proper alignment at all times.

Some features of advantage in my construction are that being suspended on a hinge the shock, when the rebound starts is first taken up by the resilient matter in the lower part of the cylinder casing which is released and allowed to expand until the disk on the rod is brought against the resilient matter in the hood of the cylinder casing; if the shock is not overcome at this time it is gradually resisted by the inertia of the cylinder and if the shock is still not overcome then the rebound in its reduced stage is arrested by the bumper striking against the extension on the axle yoke. The effect of the invention is to overcome and arrest the rebound without producing the ill effects of a counter rebound.

Another feature of the invention is that the body of the vehicle is suspended at all times on the resilient matter within the lower part of the casing, thereby giving smooth easy riding.

Referring to the accompanying drawings which are made a part hereof and on which similar reference characters indicate similar parts, Figure 1 is an elevation of my device partly in section to show the inner construction, and Figure 2, a section on line 2—2 of Figure 1, In the drawings reference character 10 indicates a vehicle spring and 11 indicates a yoke or projecting arm fixed to the axle, this arm having an inclined lateral extension 12.

The shock absorber comprises a lower cylindrical member 13 having a cap 14 threaded thereto at 15. Within the body 13 is a mass of rubber 16 and another mass of rubber 17 is located within the cap. A rod 18 is threaded near its upper end to receive a nut 19 seated between the two masses of rubber. As here shown the nut may have a shoulder extending into a depression in the rubber while the upper end is smooth and extends into a hollow in the upper end of the rubber. At its lower end the rod 18 is forked to embrace the end of a spring 10 and a bolt 20 passes through the forks and the eye at the end of the spring to secure these parts pivotally together.

A pair of forks 21 project laterally and downward from the body 13 of the casing at opposite sides of the yoke 11 and a bolt 22 passing through openings in the forks and the yoke secures the shock absorber pivotally to said yoke and through the same to the axle of the machine. At one side of the body 13 a pair of ears 23 are provided between which is located a roller 24 of rubber or other resilient material, this rubber being journaled on a screw 25.

It is thought that the operation of the invention will be understood from the drawings. A shock due to encounter of the vehicle with an obstruction in the roadway will be cushioned by the mass 16 while the rebound will be cushioned first by the gradual return of the mass 16 to normal conditions, second by the resistance of the mass 17 to upward movement of the rod 18 and third by the resistance of the roller 24 to distortion when the shock absorber swings to the left and the roller strikes against the extension 12. This succession of steps makes for certain uniform and easy absorption of shocks whether due to impact of the wheels against the obstructions or to the rebound following such impact.

It will be obvious to those skilled in the art that other materials than rubber may be used for the cushions and various other changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A shock absorber for vehicles comprising a hollow casing pivotally mounted on a support, upper and lower resilient devices in said casing, a rod extending axially below said casing and having means at one end for attachment to a vehicle spring and having a nut adjustably mounted on its other end between said resilient devices whereby the lower of said resilient devices is adapted to cushion said vehicle under shock and the upper of said resilient devices is adapted to cushion the rebound of said vehicle, said casing being adapted to move on its supporting pivot towards said spring on reception of a shock, and being adapted to move away from said spring on the rebound from said shock, a fixed projection on said support and a rotary resilient cushioning element on said casing adapted to contact said fixed projection for limiting the movement of said casing away from said spring, substantially as set forth.

2. A shock absorber comprising a casing pivotally mounted at its lower end on a support, a rod-like element resiliently mounted to reciprocate in said casing and having means for attachment of a spring at its lower end, said casing being adapted to move on its supporting pivot towards said spring on the reception of a shock to the spring and being adapted to move away from the spring on the rebound from said shock, a fixed projection on the support for said casing and a rotary cushioning element on said casing adapted to contact said fixed projection for limiting the outward movement of said casing away from said spring, substantially as set forth.

In witness whereof, I have hereunto set my hand and seal at Indianapolis, Indiana, this 25th day of June, A. D. nineteen hundred and twenty-three.

WILLIAM GUY WALL. [L. S.]

Witnesses:
  M. L. Shuler,
  O. S. Boling.